United States Patent
Duranton

(10) Patent No.: US 7,359,340 B2
(45) Date of Patent: Apr. 15, 2008

(54) METHOD AND DEVICE FOR AUTOMATICALLY ATTRIBUTING ADDRESSES TO A PLURALITY OF MODULES INTERCONNECTED BY A COMMUNICATION NETWORK WITH COMPLEX TOPOLOGY

(75) Inventor: René Duranton, 54 rue du Général Leclerc, 78510 Triel sur Seine (FR)

(73) Assignee: René Duranton (FR)

( * ) Notice: Subject to any disclaimer, the term of this patent is extended or adjusted under 35 U.S.C. 154(b) by 965 days.

(21) Appl. No.: 10/203,543

(22) PCT Filed: Feb. 2, 2001

(86) PCT No.: PCT/FR01/00334

§ 371 (c)(1),
(2), (4) Date: Nov. 20, 2002

(87) PCT Pub. No.: WO01/58112

PCT Pub. Date: Aug. 9, 2001

(65) Prior Publication Data

US 2003/0112812 A1    Jun. 19, 2003

(30) Foreign Application Priority Data

Feb. 7, 2000 (FR) ................................. 00 01559

(51) Int. Cl.
*H04L 12/28* (2006.01)
(52) U.S. Cl. ............. 370/256; 370/255; 370/408; 370/389; 370/392; 370/453; 709/252; 709/245
(58) Field of Classification Search ........... 340/825, 340/3; 370/94, 85, 408, 409, 329, 389, 392, 370/453, 255, 256; 709/245, 252
See application file for complete search history.

(56) References Cited

U.S. PATENT DOCUMENTS

| | | | | |
|---|---|---|---|---|
| 4,412,285 A * | 10/1983 | Neches et al. | ............... | 709/252 |
| 4,445,171 A * | 4/1984 | Neches | .............. | 710/104 |
| 4,715,045 A * | 12/1987 | Lewis et al. | ............ | 375/285 |
| 5,018,139 A * | 5/1991 | Despres | .............. | 370/408 |
| 5,245,607 A * | 9/1993 | Caram | .............. | 370/238 |
| 6,014,659 A * | 1/2000 | Wilkinson et al. | ......... | 707/3 |
| 6,374,311 B1* | 4/2002 | Mahany et al. | ........... | 710/18 |
| 6,618,755 B1* | 9/2003 | Bonn | .............. | 709/223 |
| 2003/0123429 A1* | 7/2003 | Hirota et al. | ............ | 370/351 |

* cited by examiner

*Primary Examiner*—Edan Orgad
*Assistant Examiner*—Wutchung Chu
(74) *Attorney, Agent, or Firm*—Browdy and Neimark, P.L.L.C.

(57) ABSTRACT

The invention concerns a method whereby each module is determined from the address of the module located immediately upstream in the networked relative to the central unit, the detected address being transmitted by the upstream module in an attribution message, which triggers off an automatic search phase for the module without address, nearest downstream to a module with an address, during which each downstream module without address receives (50) the address attribution message, triggers (52) a delay whereof the duration is so much longer if the received message reception is low, and if at the end (54) of the delay, no address capture message is detected (53), it transmits (56) such a message, stores (57) the received address, determines the address of the nearest downstream module without address, and triggers (30) the search phase for the nearest downstream module without address.

12 Claims, 3 Drawing Sheets

METHOD AND DEVICE FOR AUTOMATICALLY ATTRIBUTING ADDRESSES TO A PLURALITY OF MODULES INTERCONNECTED BY A COMMUNICATION NETWORK WITH COMPLEX TOPOLOGY

BACKGROUND OF THE INVENTION

1. Field of the Invention

The present invention concerns a method and device for the automatic allocation of addresses to a plurality of modules interconnected by a communication network with an arborescent topology.

It applies in particular, but not exclusively, to a plurality of modules interconnected by an electric distribution network used both for the electric feeding of the modules and as a communication network for the transmission of digital messages between modules via a modulated carrier current.

It is applicable in particular to the remote control and monitoring of urban lamp posts.

2. Description of the Prior Art

It has been observed that an electric distribution network generally has a complex topology comprising a large number of intersections distributed randomly. In addition, the knowledge of the exact topology of the network has quite often disappeared, said network generally resulting from operations of successive installations carried out over several tens of years.

Moreover, if it is desired to be able to communicate with each module separately, it is necessary to allocate one address to each module.

In the context of a network of this types the allocation of an address to each module poses a large number of problems.

In fact, it is first of all necessary to ensure that the method for addressing the various modules with which it is desired to communicate is able to be applied to any network topology. Next, if it is desired to interconnect a large number of modules, the addressing of the various modules must be able to be carried out with fastidious handlings which might result in significant risks of error.

It is also essential to be able to easily add a module in the network without requiring manual interventions on other modules.

Furthermore, the range of transmissions by carrier current is relatively small. Thus, it is necessary to repeat the transmitted messages so that they arrive at their destination. Thus, it is essential that the address of each module contains the path by which the message needs to be transited so that it arrives at its destination and so as to be able to determine if a message in a specific path needs to be repeated.

The method described in the patent FR 2 734 111 filed by the Applicant is able to partially resolve these problems to the extent where it is necessary to act manually on each module still not having any address and on the module already having an address situated immediately upstream with respect to a central unit situated at the root of the arborescent network, the address of the module with no address being determined according to the address of the upstream module already having an address and according to the number of modules already having an address and connected directly to the module with an address and situated downstream of the latter.

Thus, this method does have the drawback of requiring the intervention of operators on the terrain concerned, said operators needing to take action on the control buttons provided on each module. In addition, these modules can be only accessed with difficulty as for example they may be installed several meters from the ground at the top of urban lamp posts. Furthermore, this method is not able to fully eliminate any risk of error as it is possible to initiate the allocation of an address of a module not immediately situated downstream of a module having an address.

OBJECT OF THE INVENTION OBJECT OF THE INVENTION

The aim of the invention is to resolve these problems. To this effect, it concerns a method for automatically allocating addresses to a multiplicity of modules interconnected by an arborescent topology network connected to a central unit, the address of each module being determined from the address of the module situated immediately upstream in the network with respect to the central unit and already having an allocated address, this address being transmitted onto the network by the upstream module in an address allocation message.

SUMMARY OF THE INVENTION

According to the invention, this method is characterised in that it includes a phase for automatically searching the module not having any address allocated situated the nearest downstream in the network from a module already having an address allocated, this phase including for each downstream module still not having any allocated address:

the receiving by the downstream module of the address allocation message and the triggering by the latter of a delay time whose duration is that much longer when the level of reception of the message received is low, if at the end of the delay time the downstream module does not detect in the network any address capture message, the transmission by the latter of an address capture message containing the address to be allocated, the storing by the latter of the address received as a module address, and the execution by the latter of the phase for the automatic search for the module not having any allocated address situated nearest downstream in the network.

By means of these arrangements, the invention exploits the attenuation which occurs in transmissions by carrier current so as to define a delay time whose period depends on the distance between the transmitting module and the receiving module, this delay time being triggered so as to decide which module needs to be allocated with the transmitted address. In this way, the module which is allocated with the transmitted address is the one which has the shortest delay time and thus the one closest to the transmitting module of the message. The invention also makes it possible to by degrees fully automatically allocate a respective address to all the modules of a given branch of the network connected to the central unit without involving any risk of error.

By repeating this operation for all the branches of the network, it is possible to fully automatically allocate an address to all the modules connected to the network.

Advantageously, the address of a module is determined according to that of the module immediately upstream and the possible presence of other modules already having an address and situated at the same level with respect to the central unit. As a result, the address of each module solely indicates the position of the module with respect to the other modules in the network.

According to one characteristic of the invention, the address of a given module includes an order number obtained by successively numbering all the modules situated on a path directly connecting the given module to the central unit by starting by one for the first module connected on the path to the central unit, as well as one linking address for determining the various line sections constituting the path connecting the module to the central unit. As a result, if all the allocated addresses are retransmitted to the central unit, the list of the allocated addresses makes it possible to restore the topology of the network.

According to another characteristic of the invention, the method of the invention includes a prior phase for automatically looking for a module having an address situated closest upstream in the network to a module not having any address, this module transmitting on the network a message seeking a module having an address, this phase including for each module already having an address:

the receiving by the module of the message seeking a module having an address and the triggering by the latter of a delay time whose period is that much longer when the level of reception of the message received is short, if at the end of the delay time the nodule does not detect on the network any address capture message containing the address with the predetermined value, the transmission by the latter of an address capture message, the determination by the latter of the address of the module not having any address situated immediately downstream in the network, and the transmission of an address allocation message containing the determined address.

Again, according to another characteristic of the invention, the method of the invention further includes a prior phase for the automatic search for a module not having any allocated address and situated immediately downstream of a module already having an allocated address, this phase being triggered by the central unit or by a module already having an allocated address which transmits on the network a message seeking a module without an address, this phase including for each module not having any address:

the receiving by the module of the message seeking the module without any address and the triggering by the later of a delay time whose period is that much longer when the level of reception of the message received is low.

if at the end of the delay time the module does not detect on the network any module search message, the transmission by the latter of a module search message to the central unit which has the effect of triggering the phase for the automatic search for a module having an address situated closest upstream in the network to a module not having any address.

It is possible to provide a message transmitted by the central unit for initialising the module addresses stored by all or part of the modules connected to the network so as to be able to then allocate new addresses to the reinitialised modules. In this way, it is possible to easily take into account the connection of a new module between two modules already configured.

It is also possible to ensure that the module search with no address messages are repeated by the other modules so that they can be transmitted to the extremities of the branches of the network.

The present invention also concerns a device for implementing the method.

BRIEF DESCRIPTION OF THE DRAWINGS

There follows hereafter a non-restrictive example of one embodiment of the method and device of the invention with reference to the accompanying drawings on which.

DESCRIPTION OF THE PREFERRED EMBODIMENTS

Figure 1:
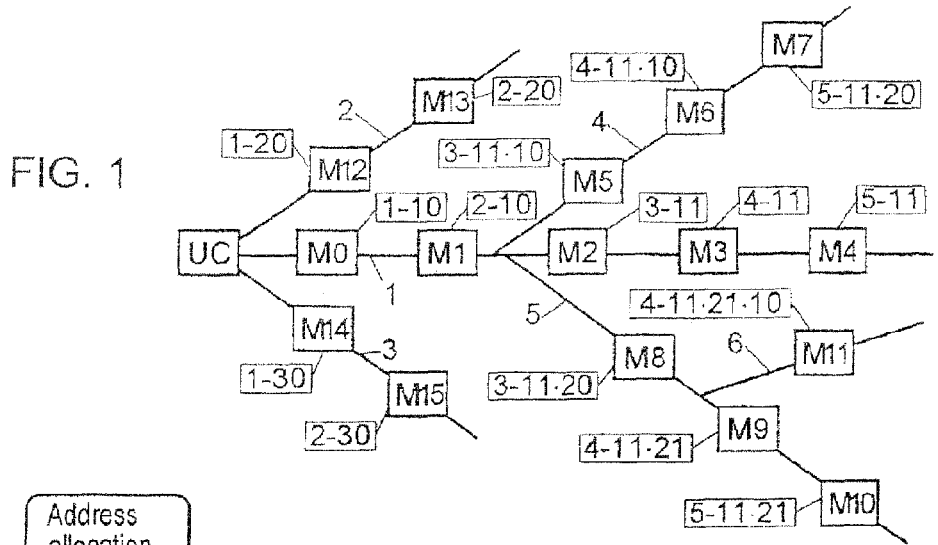
FIG. 1 diagrammatically represents a multiplicity of modules connected by a star network to which the addressing method of the invention can be applied.
Figure 4:
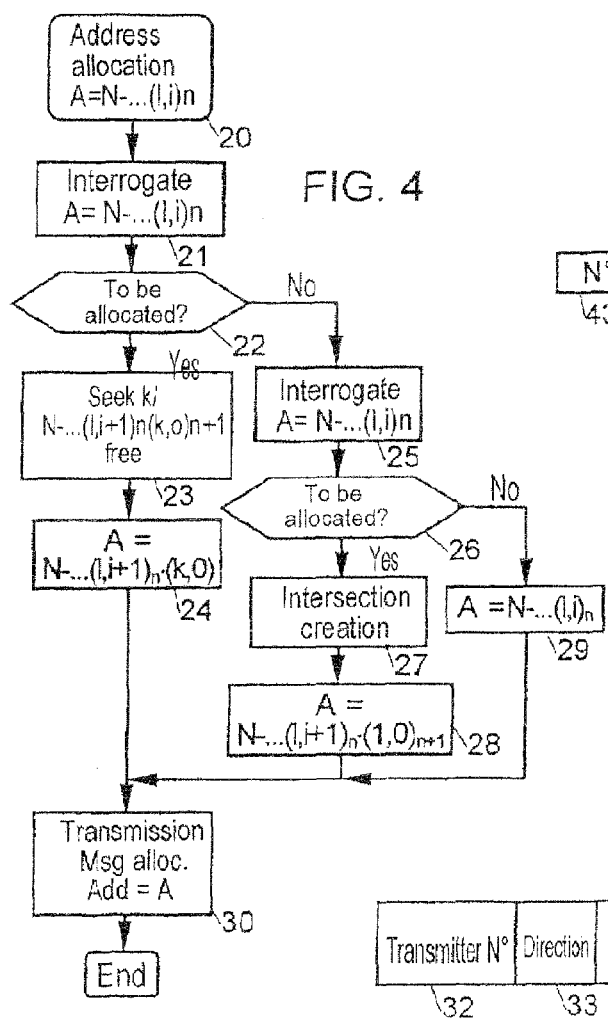
FIGS. 4 and 5 represent flowcharts showing the sequence of the stages of the method of the invention.

FIG. 1 represents a star network making it possible to connect a central unit UC to a plurality of electronic modules M1 to M15, the various elements connected by the network communicating with one another by messages, for example transmitted on the network, via the modulation of a carrier wave.

In this network, the method of the invention seeks to automatically allocate a respective single address to each module according to the position of the latter in the network. To this effect, the invention exploits the attenuation phenomenon according to the distance which occurs, especially when a signal is transmitted on an electric energy feed line. In this case, the transmissions by the network are preferably carried out by a bidirectional carrier current via the phase modulation of a carrier wave.

Figure 2:
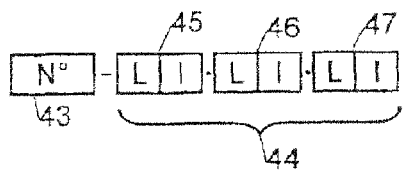
FIG. 2 shows the structure of a module address.

Each module Mi connected to the network is marked with respect to the central unit UC by an address constituted by an order number 43 and a linking address 44 (FIG. 2).

The order number 43 of each module Mi, for example on one octet is obtained by successively numbering all the modules situated on the path of the network connecting the module Mi to the central unit by starting by the number one for the module connected directly to the central unit and situated on the path in question.

Thus, on FIG. 1, the central unit UC is connected to three main lines 1, 2, 3 and the modules M0, M12 and M14 connected directly to the central unit bear an order number equal to 1, the following modules M1, M13, M15 bearing an order number equal to 2, and so on until reaching the extremity of each main line.

When a secondary line is encountered, such as 4 on the main line 1, the module M5, situated on the secondary line 4 and connected directly to the main line, bears the same order number, namely 3 in the example of FIG. 1, as that of the module M2 situated at the same level on the main line. The following modules M6, M7 on the secondary line 4 are numbered on the basis of this order number 3. Thus, the order number 43 of a module corresponds to the number of modules plus 1 situated between the module in question and the central unit UC.

The linking address 44 of a module Mi makes it possible to mark the line section (between two intersections or between one intersection and one line extremity) to which the module is connected and to determine the path connecting the module to the central unit, this number taking account of all the intersections located between the module and the central unit. Thus, this address 44 is constituted for example by three fields 45 to 47 or levels of two octets each, the first octet indicating a line number L and the second an intersection number 1.

The first level 45 gives the number of the main line 1 to 3 to which the module is connected and the number of intersections on the main line between the central unit UC and the module. If the line L and intersection I numbers of the second level 46 are different from zero, they respectively indicate the secondary line number 4, 5 to which the module is connected and the number of intersections encountered on the secondary line in the direction of the central unit. Similarly, the line number of the third level 47 makes it possible to number the second row secondary lines 6 which start from a first row secondary line 4, 5.

Thus, for example, the module M11 bearing the address "4-11-21-10" is the fourth module by leaving the central unit on the path which connects it to the latter. The field 47 indicates that it is connected to the secondary line 6, second row no 1. The field 46 indicates that this secondary line is connected to the intersection no 1 of the secondary line 5, first row no 2, and the field 45 indicates that this secondary line 5 is connected to the intersection no 12 of the main line 1 no 1.

This method for addressing a module thus makes it possible to localise any module connected to the network and determine the path which connects it to the central unit.

Figure 3:
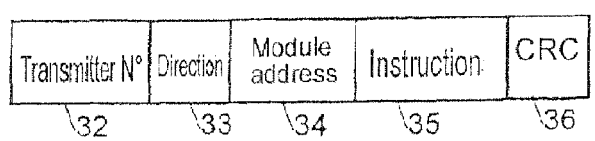
FIG. 3 shows the structure of the messages transmitted by the network.

On FIG. 3, each message transiting on the network includes the following fields:

a transmitter order number 32 of the last retransmitting module on one octet, a transfer direction 33 on one octet, namely 0 for the messages intended for the modules Mi, and 1 for those messages intended for the central unit UC, an address 34 on 7 octets of the transmitting module or receiver of the message according to the direction 33, instructions 35 or information to be transmitted on 3 octets, and a control sum word 36 on 2 octets making it possible to ensure that the contents of the message have been correctly transmitted.

Each module Mi which receives a message starts by determining if it is the intended addressee of the message by reading the "direction" field and if the direction is equal to 0' the "address" field of the destination module. If it is not the intended recipient of the message, the module examines the fields 32 to 34 so as to determine if it is located on the transmission path of the message and at a sufficient distance from the transmitter. If this is the case, it repeats the message by inserting its order number in the field 32.

By means of this structure, a message transiting on the network can be repeated by the various modules Mi of the network so as to go beyond the limited range (several hundreds of meters) of transmissions by a carrier current.

So as to avoid complex handlings and sources of error, the address of the modules is determined automatically. In the following, the address of a module shall be noted $N\text{-}(I,i)_1.(I,i)_2.(I,i)_3$ or more generally $N\text{-}\ldots(I,i)_n$, n being the last positive level 45 to 47 of the linking address 44.

According to the flowchart shown on FIG. 3, the central unit UC executes a procedure 20 for the automatic allocation of addresses starting by a phase for finding the next address to be allocated (stages 21 to 29) on the basis of the address $A=\text{"N-}\ldots(I,i)_n\text{"}$ passed as a parameter of the procedure.

On initialisation of the network, the first address to be allocated to the first module encountered on the network from the central unit is equal to A="1-10".

This phase commences by interrogating the modules Mi so as to determine if the address $A=\text{"N-}\ldots(I,i+1)_n\text{"}$ has not already been allocated (stage 21). This interrogation consists of transmitting a first interrogation message containing this address and of awaiting the response for a period Tmax.

If the central unit does not receive any response (stage 22), this means that the address A transmitted has not been already allocated. In the present case, this also means that an intersection has still not been detected on the line 1. In this case, it transmits a new interrogation message containing the address $A=\text{"N-}\ldots(I,i)_n\text{"}$ passed as a parameter of the procedure 20 (stage 25). If no reply is received, this address can therefore be allocated (stage 29) and the central unit transmits an address allocation message containing this address, in this case "1-10" (stage 30).

Figure 5:
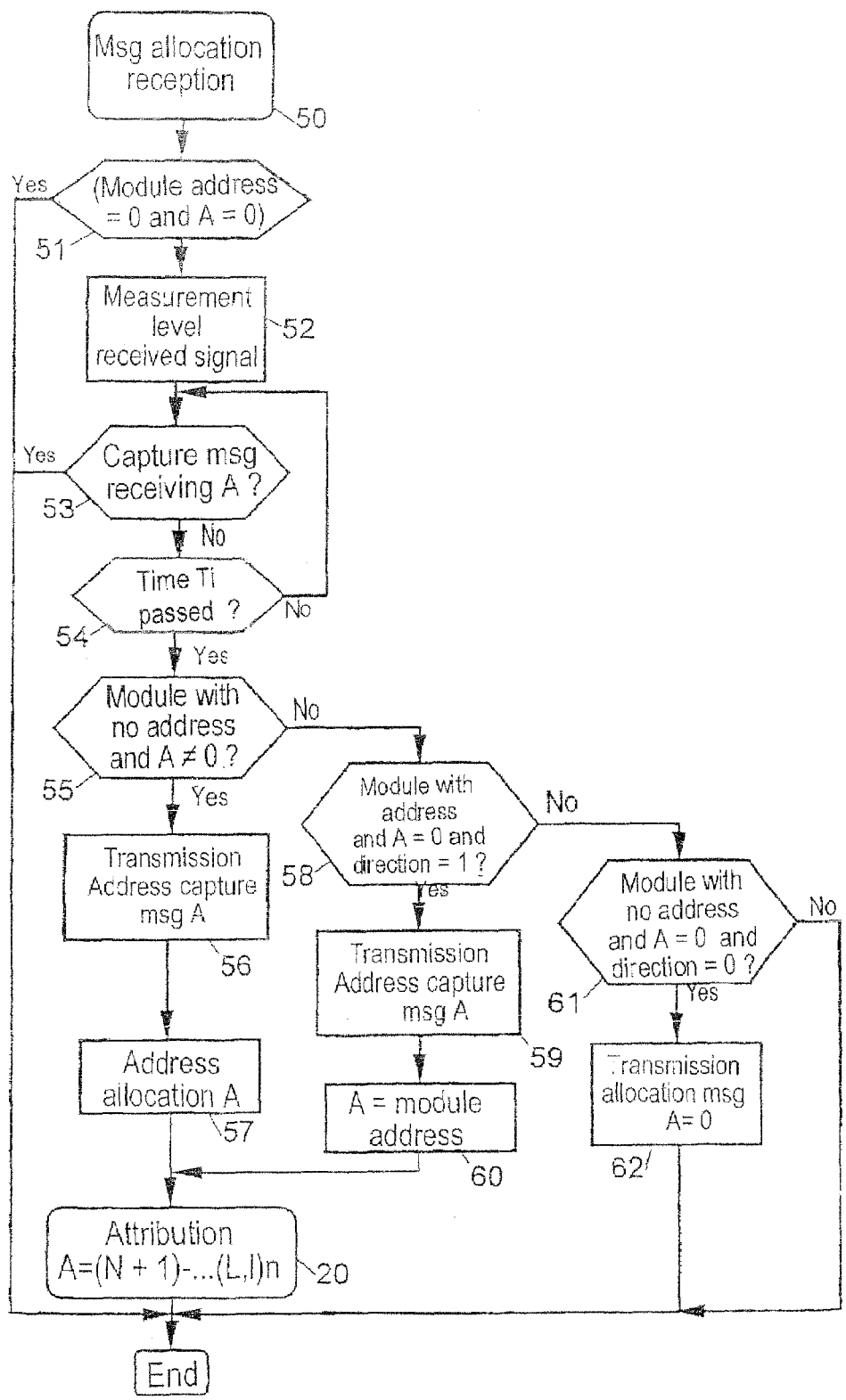

All the modules Mi which receive this message execute the procedure 50 shown on FIG. 5. In this procedure, if the module Mi still does not have an allocated address (stage 51), it measures the voltage level N of the carrier wave received and converts this level into a time Ti, knowing that the received voltage level decreases according to the transmission distance. (stage 52). Thus, the time Ti can be calculated by the following formula:

$$Ti = \frac{(N\max N)}{N}$$

where Nmax is die maximum level likely to be received.

In this way, the higher is the voltage level of the signal received, the shorter is the time Ti. Moreover, if Ti is greater than a value Tmax, it is considered that the module is too distant and the procedure is abandoned.

In stages 53 and 54, the module Mi awaits a message for capturing the address A contained in the address allocation message. If this message is not received during the time Ti, this means that the module Mi is situated closest to the transmitter of the address allocation message. If this is not die case, the procedure 50 is terminated.

If the module Mi is closest to the transmitter of the address allocation message, it transmits an address capture message (stage 56) and is allocated the address A which it stores in a memory location provided for this purpose (stage 57). The transmission of the capture message in stage 56 has the effect of interrupting the procedure 50 being executed by the other modules on stand by in stages 53 and 54.

After stage 57, the module Mi executes the previously described procedure 20 with the address $A=\text{"}((N+1)\text{-}\ldots(I,i)_n\text{"}$, that is in this case "2-10" for allocating an address to the closest non-programmed module in the network, that is to the module M1.

According to FIG. 1, the main line 1 is divided into three branches 1, 4, 5 after the module M1 which is directly connected to the modules M2, M5 and M8 situated downstream in the network with respect to the central unit UC.

When the module M1 is about to allocate an address to the next module by transmitting the address "3-10", this is the closest module, for example the module M2 which is going to allocate this address. On the next iteration, the module M2 shall allocate the address "4-10" to the closest module, namely the module M3.

When the module M4 having received the address "5-10" situated at the extremity of a branch of the network is to execute the procedure 20 with the address "6-10", no module shall respond to the address allocation message transmitted in stage 27 and no module carries out any processing.

As a result, at the end of this first sequence of iterations, only the modules M0 to M4 connected on a given branch of the network have an address.

During this sequence, the central unit UC remains available to pick up the messages from the network so as to capture all the address capture messages and store all the addresses which have been allocated.

At the end of this sequence, the central unit UC transmits a module search message with no address, possibly constituted by an address allocation message whose "address" field 34 is equal to a predetermined value, for example 0, the direction indicated in the message in the field 33 being at 0 (towards the modules). All the modules which receive this message trigger the procedure 50 shown on FIG. 5 and go on stand by for receiving a message during the time Ti (stages 52 to 54).

Each module which does not have an address yet awaits for a module search message with an address transmitted in the direction of the central unit this message able to be constituted by an address allocation message whose "address" field 3' is equal to 0 and the "direction" field 33 equal to 1 for a time Ti corresponding to the level of the signal received (stage 61). If during this time no other module has transmitted such a message, it transmits in stage 62 an address allocation message with the address "field" A equal to 0 and the "direction" field equal to 1 (towards the central unit). In this way, only the module not having any allocated address situated closest to the module or central unit responds and is the transmitter of the address allocation message whose "address" field is equal to 0.

All the modules Mi which receive this address allocation message again initiate the procedure 50 (stages 51 to 54) and the first module with no address, namely M12 or M14, receiving the message then transmits in turn an address allocation message with the "address" field 34 at zero (stages 55, 58, 61 and 62). The central unit UC and all the modules with an address receive this message (stages 51 to 54) and the central unit which is situated closest to the module M12 or M14 shall transmit an address allocation message with the "address" field 34 equal to "1-20" knowing that the address "1-10" has already been allocated (stages 58 to 60 and procedure 20).

In this way, at the end of the second and third sequences of iterations, the modules M12 to M14 of the two main lines 2, 3 shall respectively receive the addresses "1-20", "2-20", "1-30" and "2-30".

In the fourth sequence of iterations, the central unit again transmits an address allocation message whose "address" field 3' is at zero and the module M5 closest to the central unit and still not having any address shall in its turn transmit an address allocation message whose "address" field is at zero (stages 51 to 55, 58, 61 and 62). Only the module M1 already having an address and situated closest upstream of the transmitting module M5 responds to this message by transmitting an address capture message with A=0 (stages 51 to 55 and 58 to 60) and triggers the address allocation procedure 20 by using its address whose order number 43 is increased by 1, that is A="(N+1)- ... (I,i)$_n$", namely in the example describes "3-10".

According to this procedure, the module M1 first of all transmits an interrogation message concerning the address A="(N+1)- ... (I,i+1)$_n$"="3-11" (stage 21) and awaits a response (stage 22). During this time, all the modules Mi receiving this interrogation message compare the address A received with the address to which they are allocated. As this address has still not been allocated, no module replies (stage 22). As a result, the module M1 passes to the stage 25 consisting of interrogating the modules to know if the address A="(N+1)- ... (I,i+1)$_n$"="3-10" has been allocated. The module having this address transmits a message indicating that this address is allocated.

This message is received by the module M1 which then executes the stages 27, 28 designed to create a new intersection. Thus in stage 27, the module M1 triggers modification of the addresses of the modules M2 to M4 of the branch so as to replace each address A="(N)- ... (I,i)$_n$" by "(N)- ... (I,i+1)$_n$", that is replace the addresses "3-10", "4-10" and "5-10" by "3-11", "4-11" and "5-11". To this effect, it sends the module M2 an address modification message containing the new address "3-11" of the module M2. On receiving this message, the module M2 modifies its address with the new address received and sends the next module, namely M3, an address modification message. The modules M2 to M4 of the branch are thus renumbered as far as the extremity of the branch.

At the same time, the central unit receives this address modification messages and in turn updates the list of module addresses allocated in the network.

In stage 28, the module M1 determines the address to be allocated to the module M5, having regard to the detection of a new intersection by adding to it an additional level 45, 46, 47, this address being equal to "N- ... (I,i+1)$_n$, (1,0)$_{n-1}$", that is "3-11-10".

The module M1 then transmits an address allocation message containing the determined address (stage 30).

The module M5, which is the module closest downstream from the module M1 and which still does not have any address, is allocated this address (stages 51 to 57) and triggers the procedure 20 for allocating an address to the closest module, that is the module M6.

At the end of this fourth sequence of iterations, all the modules M5 to M7 of the branch 4 shall thus receive an address.

At the end of this sequence, the central unit initiates a new sequence of iterations by transmitting a "no address" module search message so as to determine if there are still modules without any address. By executing the previously described procedures, only the module M8 still not having any address and situated closest to the central unit answers this message by transmitting an address allocation message whose "address" field is at zero (stages 51 to 55, 58, 61 and 62). Only the module M1 with an address closest to the module M8 takes this message into account by executing the stages 51 to 55, 58 to 60 and seeks to allocate the address 3-10 to the module M8 by triggering the procedure 20 with this address.

In stage 21, it transmits an interrogation message containing the address 3-11. As this address is already allocated to the module M2 (stage 22), which in reply transmits an allocated address message, the module M1 determines in stage 23 the address to be allocated to the module M8. This stage consists of seeking the value k so that the address N- ... (I,i+1)$_n$(k,0) is free. In the present example, thus an interrogation message shall be transmitted containing the address "3-11-10" which triggers a response from the module M5 to which this address has already been allocated. Then it transmits an interrogation message containing the address "3-11-20". As this address has not been allocated, no module answers and the module M1 deduces from this that this address is free. Thus, it transmits an address allocation message containing this address (stage 30). As previously described, this message triggers the address allocation to the modules M8 to M10 which shall successively receive the addresses "3-11-20", "4-11-20" and "5-11-20".

At the end of this fifth sequence of iterations, only the module M11 still does not have any address.

In the sixth sequence of iterations, still initiated by the central unit via the transmission of an address allocation message whose "address" field is at zero, the module M11 answers that it still does not have an address. As previously described, the module M8, which is the closest module upstream with an address, triggers the address allocation procedure 20 and determines the address to be allocated to this module by transmitting address interrogation messages. Thus, it shall detect the presence of an intersection and create this intersection by renumbering the downstream modules M9 and M10 which shall therefore receive the addresses "4-11-21" and "5-11-21". Then the module M8 transmits an address allocation message containing the address "4-11-21-10", this address being received and accepted by the module M11 (stages 51 to 57) which shall attempt to allocate the address "5-11-21-10" to the next module. If the module M11 is the last module of the network branch to which it is connected, this sequence ends.

The central unit initiates a seventh sequence to see if there are still modules having no address in the network. If all the modules of the network have an address, no module will answer the address allocation message transmitted by the central unit and the address allocation procedure of the invention ends.

So as to be able to establish the relation between the allocated addresses and the geographical position of the modules Mi, it is possible to ensure that the address capture message transmitted in stage 56 by each module which is allocated with an address contains a module identification code, for example a series number.

It is also possible to provide on each module a control button for manually triggering the transmission of a module search message with a view to allocating an address to those modules which still do not have one. If the module in question still has no allocated address, it transmits an address allocation message to the central unit ("address" field 3' equal to 0 and "direction" field 33 equal to 1), which makes it possible to look for the closest upstream module having an allocated address (stages 50 to 56, 58 to 60). If this module already has an address, it transmits an address allocation message whose fields "address" and "direction" are equal to 0 so as to look for the module situated closest downstream still not having any address.

Figure 6:
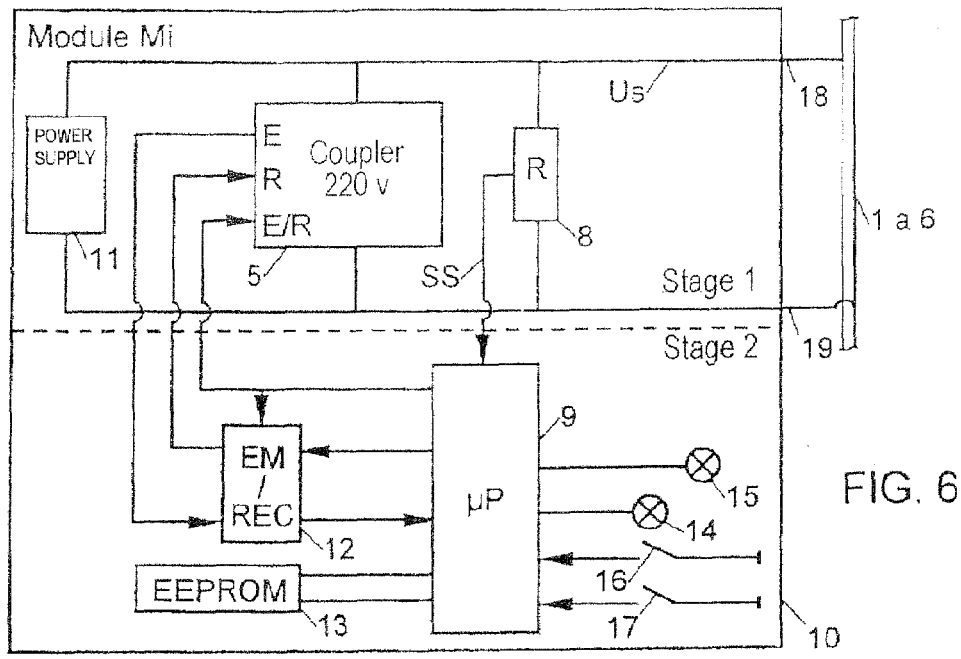
FIG. 6 represents a module according to the invention.

FIG. 6 shows a module example Mi in which the method of the invention can be implemented, this module being designed so as to use an electric energy distribution network as a communication network. On this figure, the module Mi 10 includes at least two stages, namely:

a first stage for feeding the module 10, coupling of the latter to the electricity distribution network and the generation of a synchronisation signal on the basis of the voltage Us provided by the electric network, and a second stage organised around a processor 9 (for example a microprocessor) ensuring control of the entire module and in particular executing the previously described procedures 20 and 50.

The first stage includes:

a feed circuit 11 which, on the basis of the voltage Us between the phase 18 and the neutral 19, provides the power voltages required for the various elements of the module 10, a coupling circuit 5 connected between the phase 18 and the neutral 19 and designed to ensure the exchange of information between the processor 9 and the electric network, and a synchronisation circuit 8, also connected between the phase 18 and the neutral 19 and designed to generate a synchronous logic signal SS of the electric voltage Us provided by the electric network, this logic signal SS being applied to an input of the processor 9.

The coupling circuit 5 can be embodied with the aid of a transformer or a LC type resonating circuit adjusted to the frequency of the transmission carrier of the messages via a carrier current.

The second stage, or control stage, includes around the processor 9:

a non-volatile memory (for example an EEPROM type memory) for saving information, especially the information linked to the configuration of the module 10 and its address, and a transmission/receiving circuit 12 designed to modulate the information to be transmitted and provided by the processor 9, and to send the signal obtained to the coupling circuit 5 and for demodulating and amplifying the information signals transmitted by the coupling circuit 5 and delivering the processor 9 with the information obtained.

Moreover, the processor 9 is connected to two indicator lights, a red indicator light 14 for signalling faults, and a green indicator light 15 for signalling operating states. It is also connected to a stop/start button 16, and a button 17 able to trigger the transmission of an address allocation message whose "address" field 34 is at zero, especially at the time of installation and connection of the module to the network. When the transmission of this message is triggered in this way, the processor 9 shall read in the memory t3 the address allocated to the module 10, this address being able to be nil if no address has previously been allocated to the module.

As previously mentioned, the processor 9 communicates with the central unit UC an the other modules Mi by messages transmitted via carrier current, these messages being transmitted for example by the phase modulation of a frequency of 132 kHz via the electric distribution network.

The stages 52 to 54 can be implemented by a delay line outside the processor 9, for example integrated in the receiving/transmission circuit 12.

Figure 7:
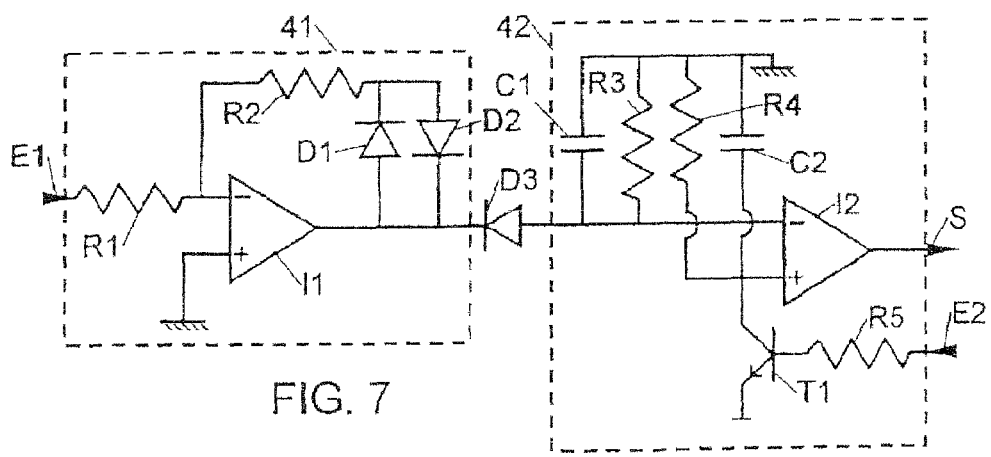
FIG. 7 shows the electronic diagram of an electronic circuit of the module used by the method of the invention.
Figure 8:
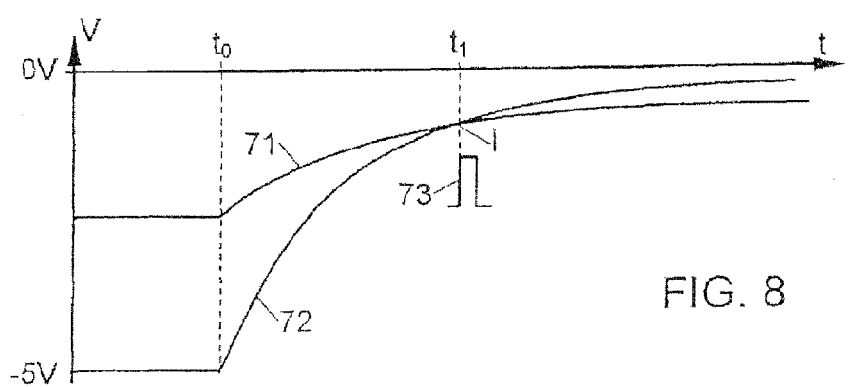
FIG. 8 shows in the form of time controlled curves the functioning of the electronic circuit shown on FIG. 6.

As shown on FIG. 7, this delay line includes a first stage 41 for detecting the receiving of a message, and a second delay stage 42, these two stages being connected by a reciprocal mounted diode D3.

The first stage 41 is in fact designed to detect the negative portion of the envelope of the received modulated carrier wave. To this effect, it comprises an input EI receiving the modulated signal received by the network, said input being connected by means of a resistor R1 to the inverter gate input of an operational amplifier whose non inverter gate input is connected to the ground. At the same time between the inverter gate input and the output of the amplifier 11, this circuit includes a resistor R2 connected in series to two diodes D1, D2 mounted head-to-tail, the joining point between the output of the comparator I1 and the diodes D1, D2 being connected to the diode D3.

The second stage 42 comprises a first capacitor discharge circuit including a capacitor C1 and a resistor R3 both mounted in parallel between the diode D3 and the ground, the joining point between the diode D3, the capacitor C1 and the resistor R3 being connected to the inverter gate input of a comparator I2. This stage also includes a second capacitor discharge circuit including a capacitor C2 and a resistor R4 mounted in parallel between the ground of the circuit and the non-inverter input of the comparator I2, the latter being connected to the transmitter of a transistor Ti, for example an npn type, whose collector is connected to a reference voltage, for example the negative supply terminal of the circuit (−5 volts). The delay line further comprises an output S constituted by the output of the comparator I2 and a control input E2 connected to the base of the transistor T1 by means of a resistor R5, the output S and the input E2 being connected to the processor 9.

The first stage provides at its output a nil voltage signal when no message is currently being received and a signal approximately at a constant to voltage corresponding to the level of the negative envelope of the modulated carrier wave received by the module 10. As a result, during the receiving of a message, the capacitor C1 is charged with the measured voltage. At the same time, the capacitor C2 is charged with the maximum negative voltage delivered via the feeding of the circuit as long as the transistor T1 is operating, that is as is long as a control voltage is applied to the input E2 by the processor 9.

Of course, this circuit can be designed to carry out a detection of the positive envelope of the transmission carrier. In this case, the collector of the transistor T1 is connected to the positive supply terminal of the circuit and the transmitter of the transistor to the comparator I2.

FIG. 7 illustrates the functioning of the delay line shown on FIG. 6. This figure shows two curves 71, 72 representing the time-controlled evolution of the voltages at the inputs of the comparator I2, the curve 71 corresponding to the voltage at the terminals of the capacitor C1, and the curve 72, the voltage at the terminals of the capacitor C2.

These two curves first of all exhibit a constant level which for the curve 71 corresponds to the receiving period of a message and for the curve 72 in the period during which the capacitor C2 remains charged, the transistor T1 being conductive. At the instant to, the transmission of the message currently being received ends and the voltage at the output of the stage 41 moves to 0. The capacitor C1 thus starts to be discharged in the resistor R3.

As soon as the processor 9 detects the end of the arrival of a message (address allocation message) at to on FIG. 7, it restores the control voltage applied to the input E2 which has the effect of triggering the discharging of the capacitor C2. When the two curves 71 and 72 meet at the point I corresponding to the instant $t_1$, the voltages applied to the input terminals of the comparator I2 are equal and thus the comparator delivers at the output S a pulse 73 which is received by the processor 9. In this way, the voltage level received at E1 has been transformed into a wait time which is compared with the time corresponding to the maximum voltage level.

The advantage obtained by using this circuit resides in the fact that a comparison is made of two exponential curves so that the weaker the signals are, the more expanded is the difference between the two curves.

It is to be noted that if a message is received before the instant $t_1$, the outgoing signal from the stage 41 reverts to a lower level and the capacitor C1 is recharged, this having the effect of moving forward the instant $t_1$ where the two curves cross. Thus, it is essential that on receipt of the pulse 73, the processor 9 sees if a message is being received. If no message is being received, the processor 9 considers that the time $Ti=t_1-t_0$ has elapsed and that it is the first stage to have received the message which has triggered the delay time Ti. In this case, it executes the stage 55. If this is not the case, execution of the procedure 50 ends.

The invention claimed is:

1. Method for automatically allocating addresses to a multiplicity of modules interconnected by a network with an arborescent topology connected to a central unit, the address of each module being determined on the basis of the address of the module situated immediately upstream inside the network with respect to the central unit and already having an allocated address, the address determined being transmitted onto the network by the upstream module in an address allocation message comprising a phase for the automatic search for a module not having any allocated address situated closest downstream in the network to a module already having an address, this phase including for each downstream module not having any allocated address:
   the receiving by the downstream module of the address allocation message and the triggering by the latter of a delay time whose period is that much greater when the level of reception of the message is low,
   if at the end of the delay time the downstream module does not detect in the network any address capture message, the transmission by the latter of an address capture message containing the address to be allocated, the storing by the latter the address received as a module address, the determination by the latter the address of the module not having any allocated address situated the nearest downstream in the network and the triggering by the latter of the phase for the automatic search for the module not having any allocated address situated closest downstream in the network.

2. Method according to claim 1, wherein the address of a module is determined according to that of the module situated closest upstream in the network and the possible presence of modules already having an address and situated closest downstream in the network to the upstream module so that the address of each module indicates only the position of the module with respect to the other modules in the network.

3. Method according to claim 1, wherein the address of a given module comprises an order number obtained by successively numbering all the modules situated on a path directly connecting the given module to the central unit by commencing by one for the first module connected on the path to the central unit, as well as a linking address making it possible to determine various line sections constituting the path connecting the module to the central unit.

4. Method according to claim 1, which comprises a prior phase for the automatic search for a module having an address situated closest upstream in the network to a module not having any address, this module transmitting on the network a message seeking a module having an address, this phase including for each module already having an address:
   a step of receiving by the module the message seeking a module having an address and a step of triggering by the latter a delay time whose period is that much greater when the level of reception of the message received is low,
   if at the end of the delay time the module does not detect on the network any address capture message, a step of transmitting by the latter an address capture message, previously a step of determining by the latter the address of the module not having any address situated immediately downstream in the network, and a step of triggering by the latter the phase for the automatic search for a module not having any allocated address situated closest downstream in the network.

5. Method according to claim 4, wherein further comprises a prior phase for automatically seeking a module not having any allocated address situated immediately downstream of a module already having an allocated address, this phase being triggered by the central unit or by a module having an allocated address which transmits on the network a message seeking a module with no address, this phase including for each module not having any address:
  a step of receiving by the module the message seeking a module with no address and a step of triggering by the latter a delay time whose period is that much greater when the level of reception of the message received is weak,
  if at the end of the delay time the module does not detect on the network any module search message, a step of transmitting by the latter a module search message in the direction of the central unit, which has the effect of triggering the phase for the automatic search for a module having any address situated closest upstream in the network to a module not having any address.

6. Method according to claim 4, which further comprises the repetition by the other modules of the network messages for seeking modules with no address so that they are able to be transmitted to extremities of branches of said network.

7. Method according to claim 1, which further comprises the transmission by the central unit of a message for initialising the addresses stored by at least one portion of the modules of the network.

8. Method according to claim 1, which comprises the transmission of address capture messages to the central unit which stores the allocated addresses contained in these messages.

9. Method according to claim 1, wherein the address capture message transmitted by each module allocated with an address contains an identification code of the module.

10. Device for automatically allocating an address to one determined module of a multiplicity of modules interconnected by a network with arborescent technology connected to a central unit, each modules of said multiplicity comprising processing means, means for receiving and for transmitting messages on said network via modulation of carrier wave, means for determining an address on the basis of the address of the module situated immediately upstream inside said network with respect to said central unit and already having an allocated address, means for transmitting an address allocation message comprising an address so determined onto the network, means for automatic searching for a module not having any allocated address located closest downstream in the network to a module already having an address, said automatic searching means comprising means for receiving said address allocation message and means for triggering a delay time whose period is that much greater when said address allocation message has a low level of reception, means for transmitting an address capture message containing the address to be allocated if at the end of the delay time the downstream module does not detect in the network any address capture message, means for determining address of a module not having any allocated address situated the nearest downstream in
  the network and means for triggering a phase for the automatic search for a module not having any allocated address situated closest downstream in the network.

11. Device according to claim 10, wherein said modules comprises means for communicating with one another and the central unit by a phase-modulated bidirectional carrier current.

12. Device according to claim 10, wherein each module comprises a delay line controlled by the processor, this line including a stage for detecting the presence of a message in the course of being received, and a delay time stage including a first circuit for discharging a first capacitor which is charged with the level of the receiving signal of the message, and a second circuit for discharging a second capacitor which is charged with a reference voltage, the two capacitors having respective voltages which are compared by a comparator delivering an end of delay time signal when the two capacitors have identical voltages, the delay time circuit causing a discharge of the second capacitor when the first capacitor starts to be discharged at the end of the receiving of a message.

* * * * *